US009764218B2

(12) United States Patent
Treadway et al.

(10) Patent No.: US 9,764,218 B2
(45) Date of Patent: Sep. 19, 2017

(54) SUSPENSION SYSTEM FOR A TRANSPORTATION DEVICE

(71) Applicant: ACTON, INC., Mountain View, CA (US)

(72) Inventors: Peter Treadway, Sunnyvale, CA (US); Janelle Wang Treadway, Sunnyvale, CA (US); Kefan Hu, Santa Clara, CA (US)

(73) Assignee: ACTON, INC., Mountain View, CA (US)

( * ) Notice: Subject to any disclaimer, the term of this patent is extended or adjusted under 35 U.S.C. 154(b) by 0 days.

(21) Appl. No.: 15/004,105

(22) Filed: Jan. 22, 2016

(65) Prior Publication Data

US 2016/0213999 A1 Jul. 28, 2016

Related U.S. Application Data

(60) Provisional application No. 62/107,206, filed on Jan. 23, 2015.

(51) Int. Cl.
A63C 17/00 (2006.01)
A63C 17/12 (2006.01)
B62K 11/00 (2006.01)
A63C 17/01 (2006.01)

(52) U.S. Cl.
CPC .......... A63C 17/0046 (2013.01); A63C 17/12 (2013.01); B62K 11/007 (2016.11); A63C 17/014 (2013.01)

(58) Field of Classification Search
CPC ....... A63C 17/004; A63C 17/08; A63C 17/04; A63C 17/12; A63C 5/035; A63C 17/1409; A63C 11/023
See application file for complete search history.

(56) References Cited

U.S. PATENT DOCUMENTS

| 196,230 | A | * | 10/1877 | Hutton | A63C 17/02 280/11.28 |
| 1,632,997 | A | * | 6/1927 | Connolly | A63C 17/04 280/11.19 |
| 1,798,794 | A | * | 3/1931 | Harston | A63C 17/04 280/11.26 |
| 4,134,600 | A | * | 1/1979 | McDonald | A63C 5/035 280/11.28 |
| 4,272,091 | A | * | 6/1981 | Reid, Jr. | A63C 17/04 280/11.19 |
| 4,541,643 | A | * | 9/1985 | Pavincic | A63C 17/004 280/11.201 |

(Continued)

Primary Examiner — Hau V Phan

(57) ABSTRACT

The disclosed embodiments are directed to a transportation device, such as a skate. The transportation device may include a frame configured to support at least a portion of a user, and a support system configured to support the frame above the ground. The support system may include a first wheel connected to the frame, a second wheel connected to the frame, and a suspension system connected to the frame and positioned between the first and second wheel. The suspension system may include a rear wheel pivotally connected to a first portion of the frame, and a shock absorber connected between the rear wheel and a second portion of the frame. The shock absorber may be configured to dampen movement by the rear wheel with respect to the first portion of the frame.

29 Claims, 5 Drawing Sheets

(56) References Cited

U.S. PATENT DOCUMENTS

| | | | | |
|---|---|---|---|---|
| 5,029,887 A | * | 7/1991 | Grutzner | A63C 17/12 |
| | | | | 280/242.1 |
| 5,478,094 A | * | 12/1995 | Pennestri | A63C 17/1409 |
| | | | | 280/11.207 |
| D473,905 S | * | 4/2003 | Schnuckle | D21/765 |
| 6,557,861 B2 | * | 5/2003 | Saylor | A63C 17/04 |
| | | | | 280/11.19 |
| 6,959,933 B1 | * | 11/2005 | Roth | A63C 17/08 |
| | | | | 280/11.19 |
| 7,150,461 B2 | * | 12/2006 | Schnuckle | A63C 11/023 |
| | | | | 280/87.042 |

* cited by examiner

SUSPENSION SYSTEM FOR A TRANSPORTATION DEVICE

CROSS REFERENCE TO RELATED APPLICATION

The present application claims the benefit of priority to U.S. Provisional Application No. 62/107,206, filed Jan. 23, 2015, the entire content of which is incorporated herein by reference.

TECHNICAL FIELD

This disclosure relates generally to a transportation device. More specifically, it relates to a suspension system for a transportation device.

BACKGROUND

Motorized vehicles, such as motorized scooters and mopeds, allow convenient transportation and can also provide personal enjoyment during leisure time. Conventional motorized vehicles, however, are difficult to use and require extensive practicing to ensure safety and efficiency. Many local communities require a license to operate the conventional motorized vehicles. When not in use, the conventional motorized vehicles require a parking space for proper storage. In addition, the conventional motorized vehicles are expensive and may require significant maintenance costs. For these reasons, consumers may consider using other transportation devices, such as wearable transportation devices that overcome one or more of these problems.

Wearable transportation devices, such as roller skates, roller blades, and the like, provide a user with portability and ease of operation, but may require significant expenditure of energy on the part of the user. To alleviate this stress on the user, some wearable transportation devices may include motorized features. In both forms, however, the structural arrangement and support system of a wearable transportation device is vital to providing a user with a device that is easily learned and used, comfortable, enjoyable, and practical. The present disclosure is directed to a transportation device that provides these and other advantages, while overcoming one or more of the problems set forth above and/or other problems of the prior art.

SUMMARY

In one aspect, the present disclosure is directed to a transportation device. The transportation device may include a frame configured to support at least a portion of a user, and a support system configured to support the frame above the ground. The support system may include a first wheel connected to the frame, a second wheel connected to the frame, and a suspension system connected to the frame and positioned between the first and second wheel. The suspension system may include a rear wheel pivotally connected to a first portion of the frame, and a shock absorber connected between the rear wheel and a second portion of the frame. The shock absorber may be configured to dampen movement by the rear wheel with respect to the first portion of the frame.

In another aspect, the present disclosure is directed to a skate. The skate may include a frame configured to support at least a portion of a user, and a support system configured to support the frame above the ground. The frame may include a platform, a first side support, a second side support, and a rear support. The support system may include a first wheel connected to the first side support, a second wheel connected to the second side support, and a suspension system connected to a rear portion frame and positioned between the first and second wheel. The suspension system may include a rear wheel positioned on an axle, a first swing arm connected at a first end to the axle and pivotally connected at a second end to the first side support, and a second swing arm connected a first end to the axle and pivotally connected at a second end to the second side support. The suspension system may further include a first shock absorber connected between the axle and the rear support, and a second shock absorber connected between the axle and the rear support.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
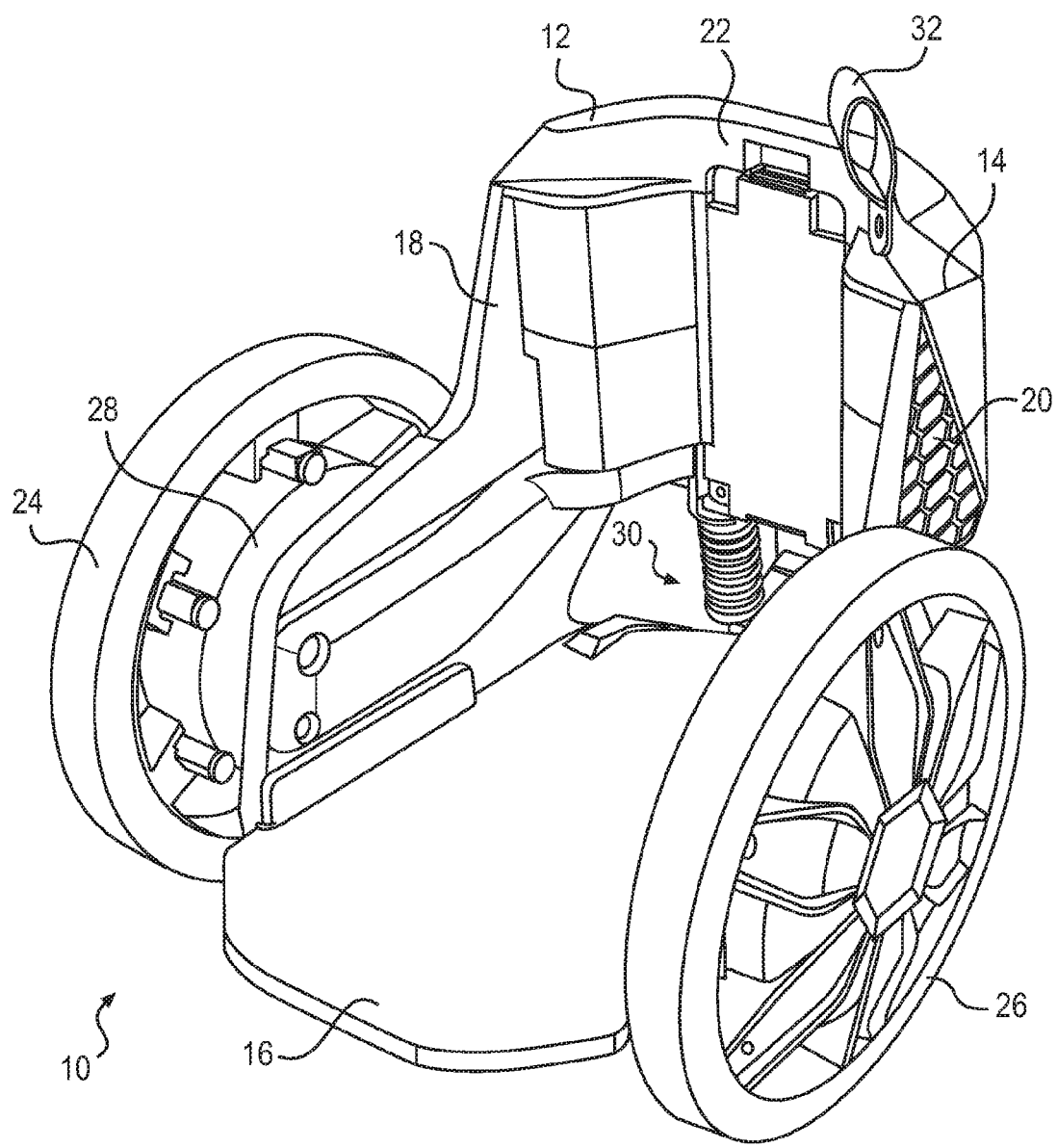
FIG. 1 illustrates an exemplary wearable transportation device, consistent with disclosed embodiments.

FIG. 1 illustrates an exemplary transportation device 10. In an exemplary embodiment, transportation device 10 may be wearable transportation device. For example, transportation device 10 may be a wearable skate 12. It should be understood, however, that at least some features of transportation device 10 may be applicable to devices that may not necessarily be considered wearable. These devices may also be wearable, but not skates. Skate 12 may be one of a pair of skates 12, although only one skate 12 is shown throughout the figures.

Skate 12 may be configured to be worn on a user's foot (or foot with a shoe). For example, skate 12 may include a frame 14 generally configured to receive at least a portion of a user's foot and/or lower leg (e.g., ankle region). Frame 14 may include frame features that form a support structure for a user's foot, including a platform 16, a pair of side supports 18, 20, and a rear support 22.

In some embodiments, frame 14 may resemble a shoe-like structure, which embraces the foot (or foot with a shoe) of a user. Platform 16 may provide main support (e.g., horizontal support) to the user. Platform 16 may generally extend in parallel to the surface of the ground on which skate 12 is operated, but may not necessarily be horizontal in a strict manner. For example, platform 16 may tilt up and down with respect to the ground surface, or may form an angle with respect to sea level when, e.g., operating on a slope.

Side supports 18 and 20 may be connected to and extend upwardly away from platform 16, on opposite sides thereof. Side supports 18, 20 may provide additional support (e.g., lateral support) to the user's foot and help maintain the user's foot in position on platform 16. In some embodiments, a securing strap (not shown) may be connected between side supports 18, 20 to help retain a user's foot within frame 14, although other configurations are possible (for example, a user's shoe may include features that securely connect to platform 16).

Rear support 22 may similarly extend upwardly away from platform 16, at a rear portion thereof. In an exemplary embodiment, however, rear support 22 may be connected to side supports 18, 20, instead of platform 16. In this way, an opening may be formed between platform 16 and rear support 22. In other embodiments, rear support 22 may be directly connected to platform 16 and may or may not form the opening. Rear support 22 may provide additional support to user, such as support to an ankle region of a user's leg. In some embodiments, an inner surface of rear support 22 may be shaped to conform to a rear portion of a user's lower leg.

In an exemplary embodiment, frame 14 may be formed as a unitary structure (e.g., molded as one part). In other embodiments, one or more components of frame 14 (e.g., platform 16, side supports 18, 20, rear support 22) may be separate from and configured to be secured to the other components. Some portions of frame 14 (e.g., inner surfaces) may include features that improve engagement with the user's foot (e.g., gripping material, padding, etc.). Other portions of frame 14 (e.g., outer surfaces) may include features that allow for the connection of other components of skate 12 to frame 14, as will be described in more detail.

Skate 12 may further include a support system configured to hold frame 14 above the ground during use. In particular, skate 12 may include a plurality of ground engaging members configured to contact the ground and provide support that holds frame 14 (and the user's foot) above the ground, and associated structural systems. In one embodiment, the support system of skate 12 may include a pair of wheels 24, 26 and a suspension system 30.

Wheels 24, 26 may be capable of moving skate 12 (e.g., while the user is wearing skate 12). Wheels 24, 26 may attach to frame 14 via one or more rotational joints (e.g., axle, bearing, etc.). In one embodiment, wheel 24 may be attached to an outer surface of side support 18 and wheel 26 may be attached to an outer surface of side support 20. Wheels 24, 26 may also be suspended from frame 14 such that they absorb imperfections on the driving surface and assist in turning.

In some embodiments, one or more of wheels 24, 26 may include a built-in driving system 28, which may include a driving element (e.g., motor(s) and/or motor driver(s)), a power source (e.g., one or more batteries), and/or other active components. For example, skate 12 may include a driving and control system, such as the system described in U.S. Provisional Patent Application No. 62/010,327, which is hereby incorporated by reference in its entirety. In other embodiments, wheels 24, 26 may include only passive components, such as hubs, bearings, axles, etc.

In some embodiments, wheels 24, 26 may be removable from frame 14. A user may change the wheels with different designs by detaching the old wheels and attaching the new wheels. Wheels 24, 26 may have any of a variety of diameters, offsets, weights, or widths. During operation, wheels 24, 26 may contact the ground and rotate to cause translational movement of frame. Suspension system 30 may be positioned to further support frame 14, such as at a rear portion of skate 12.

FIGS. 2-5 further depict skate 12, including suspension system 30. As shown in FIGS. 2-5, support system may provide support to frame 14 at a rear portion of skate 12, including at least one feature that extends below platform 16 to assist (e.g., in combination with wheels 24, 26) in supporting frame 14 above the ground. For example, suspension system 30 may include a rear wheel 36.

Rear wheel 36 may be secured to a rear portion of frame 14 and configured to roll with wheels 24, 26 as skate 12 moves across the ground. In one embodiment, rear wheel 36 may be positioned on an axle 38. In at least some embodiments, rear wheel 36 may be configured to provide stability support to skate 12. In some embodiments, rear wheel 36 may assist a control system in making a tilting angle determination (e.g., determining whether platform 16 is tilted rearward or forward). In some embodiments, rear wheel 36 may also be configured to provide driven force, e.g., to be driven by a motor. In an exemplary embodiment, wheels 24, 26 may be much larger than rear wheel 36. For example, diameters of wheels 24, 26 may be at least three times greater than a diameter of rear wheel 36.

In an exemplary embodiment, axle 38 may be secured to a lower portion of frame 14 by a pair of swing arms 40, 42. For example, swing arm 40 may be secured to axle 38 at a first end and to frame 14 at a second end. Swing arm 42 may be similarly secured to axle 38 at a first end and to frame 14 at a second end (e.g., on an opposite side of rear wheel 36). Swing arms 40, 42 may be rigid members pivotally connected to frame 14 at respective pivot connections 44. In this way, swing arms 40, 42 may be configured to rotate about their connection with a lower portion of frame 14 such that rear wheel 36 and axle 38 may move vertically with respect to a horizontal plane defined by platform 16.

Figure 2:
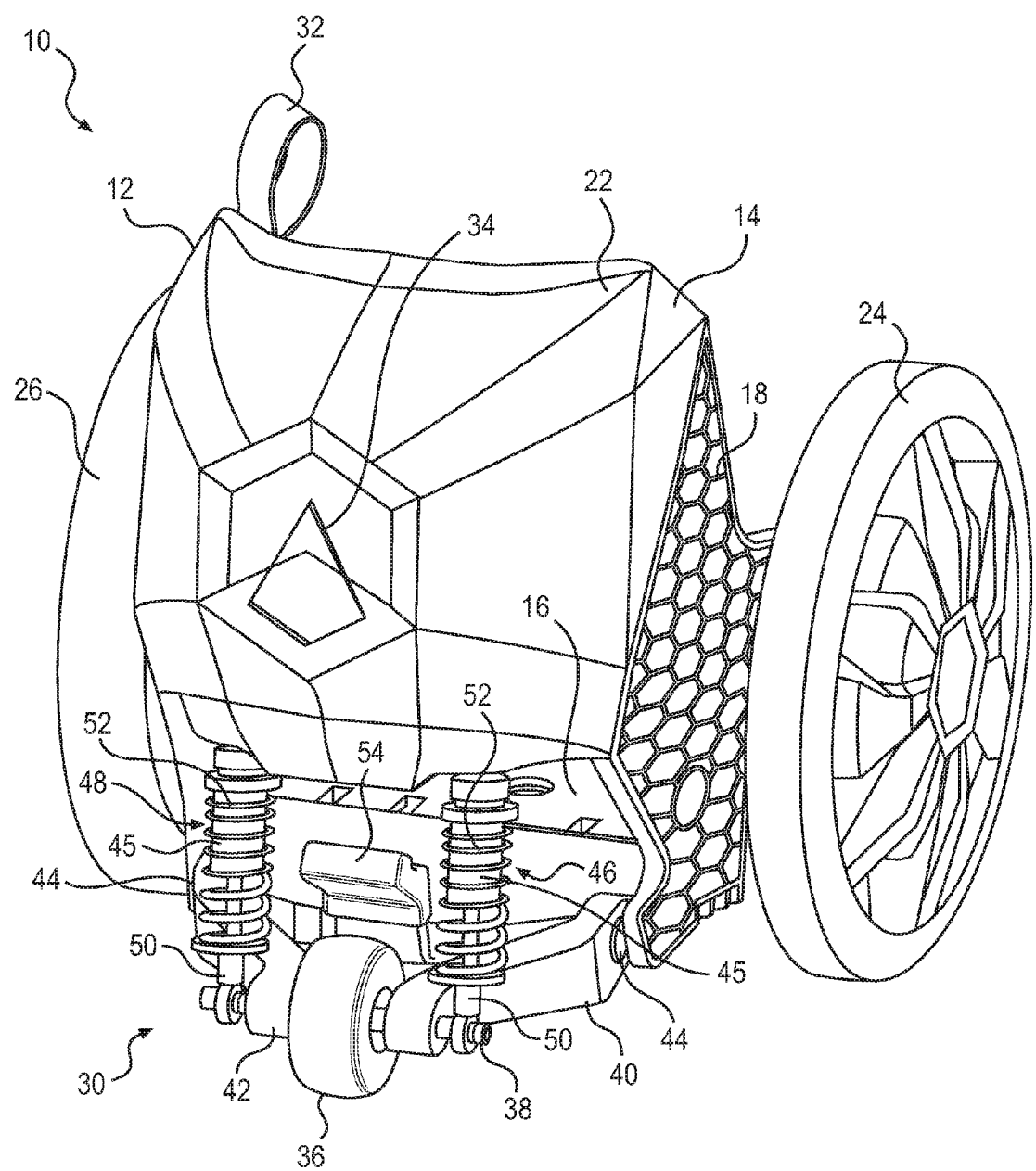
FIG. 2 illustrates another view of the wearable transportation device of FIG. 1, including an exemplary suspension system in a first position, consistent with disclosed embodiments.
Figure 3:
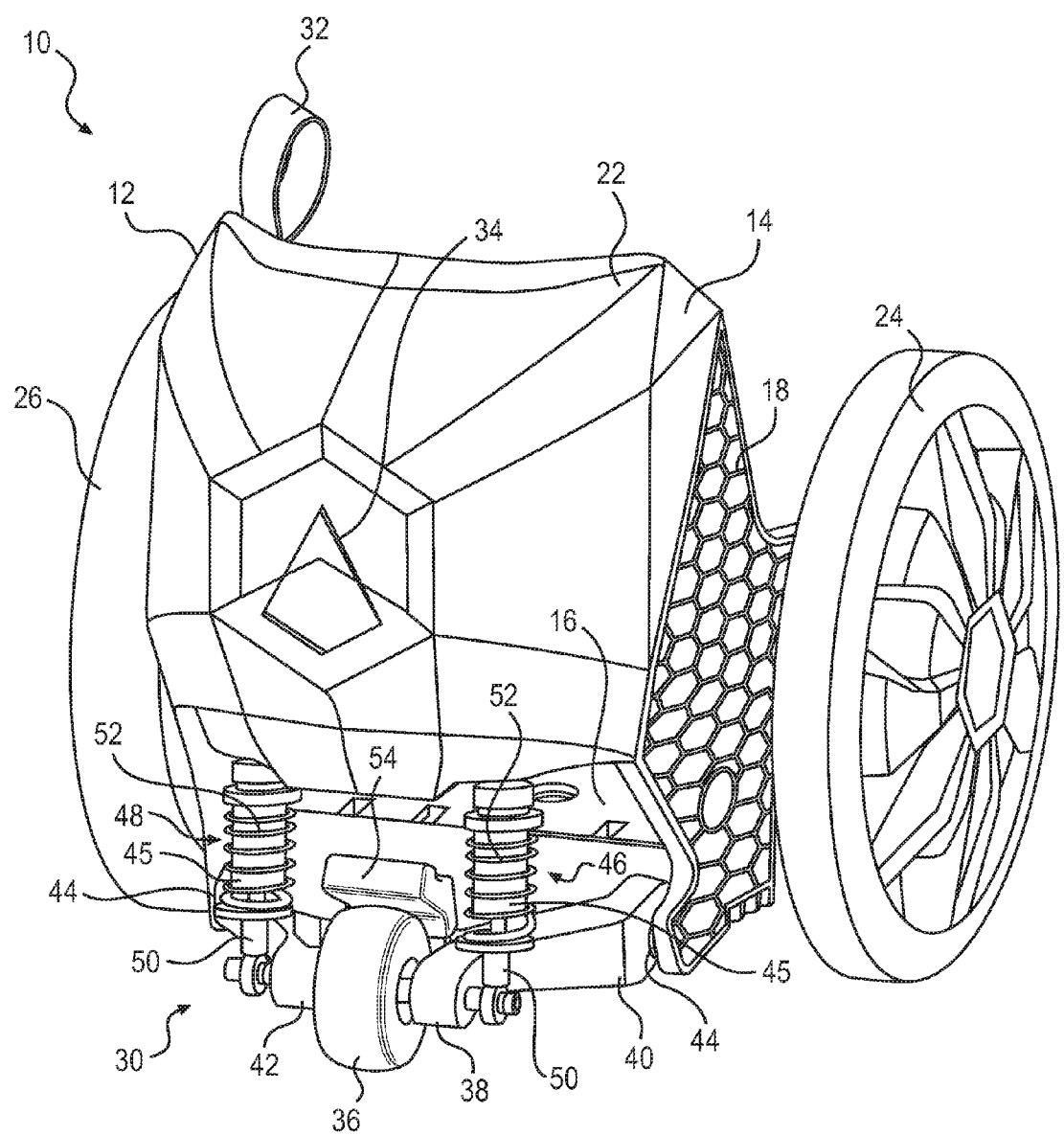
FIG. 3 illustrates the wearable transportation device of FIG. 2, including the suspension system in a second position, consistent with disclosed embodiments.

As shown in FIGS. 2-3, swing arms 40, 42 may each include a longitudinally-extending, angled shape that extends away from frame 14 and inward, toward rear wheel 36. Accordingly, swing arms 40, 42 may be secured to outer regions of frame 14 (e.g., side supports 18, 20) and extend toward each other as they extend away from frame 14. It should be understood, however, that other shapes and configurations of swing arms 40, 42 are possible. For example, a single, Y-shaped swing arm may be used to pivotally connect axle 38 to frame 14.

Rear wheel 36 may be further connected to frame 14 by at least one shock absorber 45. In an exemplary embodiment, rear wheel 36 may be connected (e.g., via axle 38) to frame 14 by a pair of shock absorbers 46, 48. For example, axle 38 may be connected to rear support 22 by a first shock absorber 46 on a first side of rear wheel 36 and a second shock absorber 48 on a second side of rear wheel 36.

Each shock absorber 45 may include a support rod 50 and a coil spring 52, although other configurations are possible. Support rod 50 may connect axle 38 to frame 14, such as a lower portion of rear support 22. In one embodiment, support rod 50 may be positioned in the opening beneath rear support 22. Support rod 50 may be configured to change in length as swing arms 40, 42 pivot about a lower portion of frame 14.

Coil spring 52 may be positioned over support rod 50 and configured to dampen movement of rear wheel 36 towards rear support 22. Coil spring 52 may be positioned between a pair of flanges connected to support rod 52. Coil spring 52 may be compressed between the flanges such that extension of support rod 52 relaxes coil spring 52 and contraction of support rod 52 further compresses coil spring 52.

In some embodiments, support rod 50 may be a shock-type member that resists a force to extend a length of support rod 50. This type of support rod 50 may dampen a reaction force of coil spring 52 (e.g., hydraulically dampened with oil). In this way, support rod 52 may provide a support force against movement of rear support 22 away from rear wheel 36, and shock absorber 45 may help prevent frame 14 from bouncing toward and away from rear wheel 36 undesirably (e.g., in a manner similar to a vehicle shock). In other embodiments, support rod 50 may be an extendable member that does not resist movement.

In some embodiments, suspension system 30 may further include a brake 54. Brake 54 may be configured to inhibit rotation of rear wheel 36, such as to slow down skate 12 when moving and/or maintain skate 12 in a stationary position when stopped. In an exemplary embodiment, brake 54 may include a rigid arm that extends from a lower portion of frame 14 (e.g., a rear of platform 16) to a position above rear wheel 36. Brake 54 may be configured such that rearward tilting/rotation of platform 16 causes brake 54 to move toward rear wheel 36 such that a sufficient degree of tilt/rotation causes a surface of brake 54 to contact rear wheel 36. Frictional engagement caused by the contact may inhibit rotation of rear wheel 36. Tilting in an opposite direction may cause brake 54 to move away from rear wheel 36 and/or disengage from rear wheel 36.

It should be understood that the disclosed configuration of suspension system 30 is exemplary and that other configurations are possible. For example, suspension system 30 may include a plurality of rear wheels 36 (e.g., two) which may be supported on separate suspension members. In another embodiment, suspension system may include more or less than two shock absorbers 46, 48. Further, suspension system 30 may be adapted for use with other transportation devices, such as scooters, bicycles, conventional roller skates or roller blades, and the like.

Further, skate 12 may include additional features, such as a carrying loop 32 and/or a reflector or light 34. Carrying loop 32 may be a convenient handle for allowing a user to carry skate 12 or connect skate 12 to another support (e.g., backpack, wall hook, etc.), when not in use. Reflector 34 may be a reflective material patch that improves visibility of skate 12 in low-light environments (e.g., at night).

In some embodiments, suspension system 30 may be part of a control system of skate 12. For example, a sensor (e.g., linear or rotating potentiometer) may be configured to determine a position of a component of suspension system 30 (e.g., a linear or rotational position of at least one swing arm 40, 42). In one embodiment, the sensor may be connected to at least one swing arm 40, 42 by a connecting arm 56 (shown in FIG. 5). As the measured component changes position (e.g., as movement of swing arm 40 or 42 causes connecting arm 56 to rotate), the sensor may generate a signal indicating a degree of tilting of platform 16. The signal may be used to control/operate skate 12.

The disclosed suspension system, or components thereof, may be applicable to a transportation device to provide support and control as the transportation device moves. The disclosed suspension system, such as suspension system 30, may be particularly applicable to a wearable transportation device, such as a skate. Exemplary uses and advantages of skate 12 will now be described. It should be understood that, during use, a user may wear two skates 12. The description of one skate 12 worn on a user's foot may be equally applicable to the other skate 12, worn by the user's other foot.

A user wearing skate 12 on their foot may be propelled forward (or backward) through rotation of wheels 24, 26 on the ground. Wheels 24, 26 may rotate through driving input from a motor and/or through manual input by the user (including gravitational forces when the user is traveling down a hill, for example). During use, suspension system 30 may improve comfort and balance, and absorb shocks due to rough terrain (e.g., road imperfections).

Rear wheel 36 may trail frame 14 (as skate 12 moves forward), rotating in contact with the ground, thereby allowing suspension system 30 to provide additional support and control and allowing a user to comfortably balance on a pair of skates 12. Swing arms 40, 42 may be coupled to platform 16, such that when a user presses his/her toes (or heel) down, coil springs 52 of shock absorbers 45 relax (or compress) and platform 16 tilts down (or up). This dampened movement may help provide the user with a smooth ride, as well as additional control and comfort.

Figure 4:
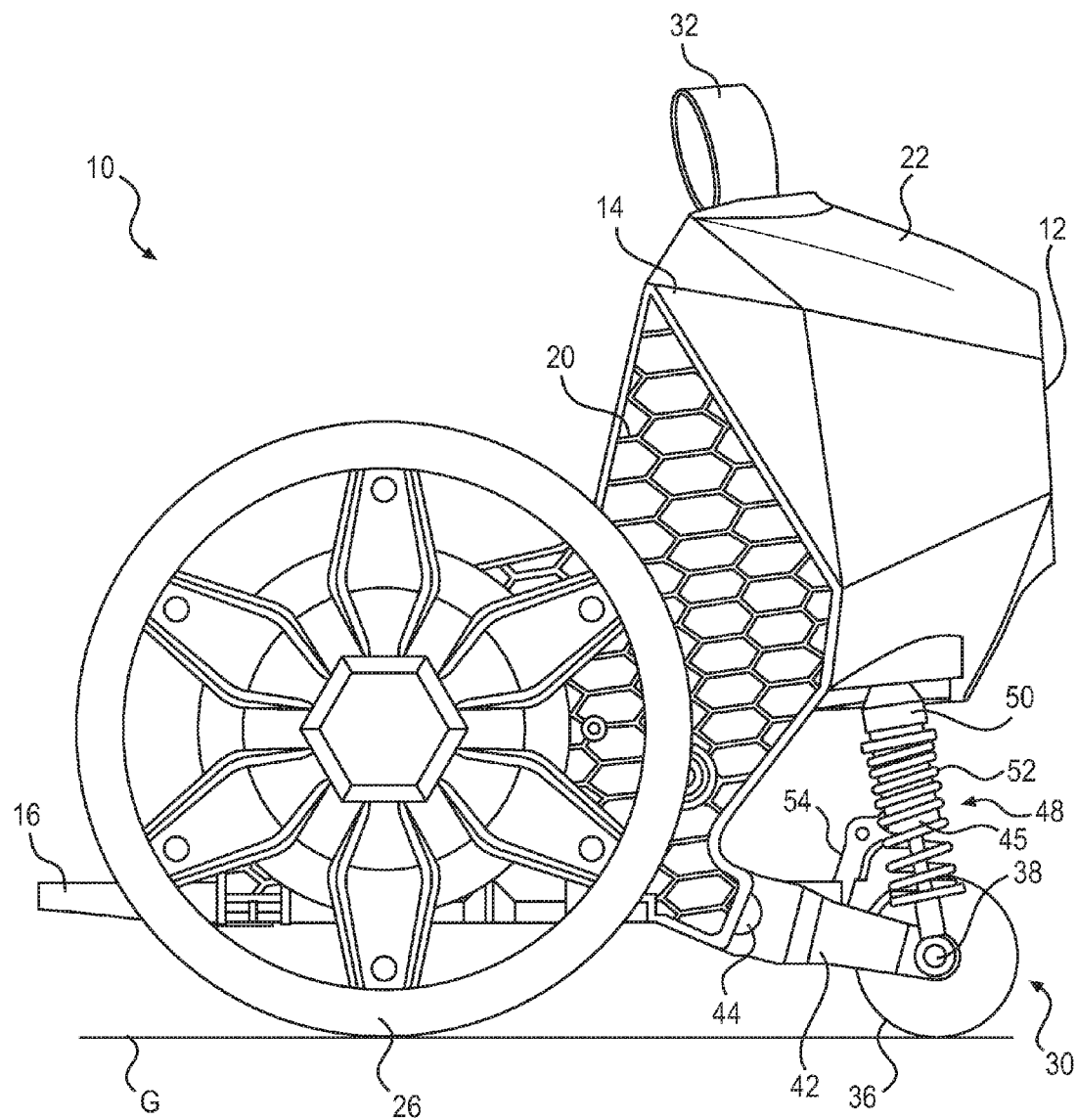
FIG. 4 illustrates a side view of the wearable transportation device of FIG. 1, including the suspension system in the first position, consistent with disclosed embodiments.

FIGS. 2 and 4 depict suspension system 30 at a first position during use of skate 12. For example, FIGS. 2 and 4 depict an equilibrium position in which platform 16 is generally parallel to the ground G. In this position, rear wheel 36 may freely rotate, allowing skate 12 to freely roll in a forward (or rearward) direction.

As skate 12 travels across the ground G, platform 16 may tilt forward or rearward for any of a number of reasons. For example, as a user shifts weight and balances on skate 12, platform 16 may tilt. In some instances, a user may purposefully tilt platform 16, such as to provide input to a control system or activate brake 54. Further, certain characteristics of the ground G, such as bumps, grades, imperfections, etc., may cause platform 16 to tilt with respect to the underlying surface. This tilting movement may cause rotation of swing arms 40, 42 about pivot connections 44 or, in other words, cause frame 14 to rotate with respect to rear wheel 36.

As frame 14 rotates with respect to rear wheel 36, shock absorbers 46, 48 may extend or retract, depending on whether the rotation causes rear support 22 to move closer to rear wheel 36 (e.g., a rearward tilt of frame 14) or further from rear wheel 36 (e.g., a forward tilt of frame 14). Shock absorbers 46, 48 may dampen this movement of frame 14, allowing rear wheel 36 to provide comfort and support to a user (e.g., helping the user to balance as frame 14 tilts).

Figure 5:
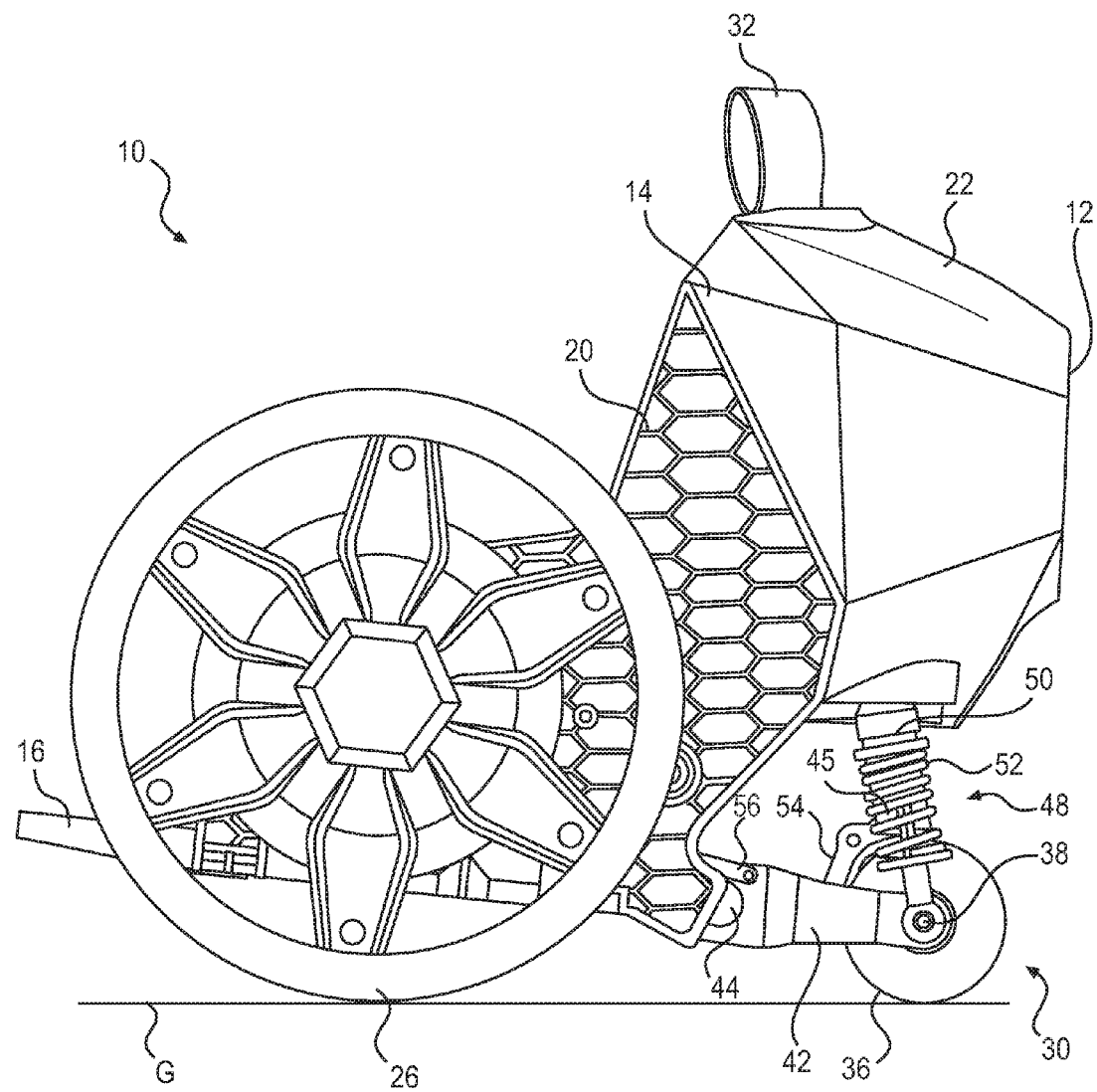
FIG. 5 illustrates the wearable transportation device of FIG. 4, including the suspension system in the second position, consistent with disclosed embodiments.

In some instances, platform 16 may be tilted rearward until suspension system 36 reaches a second position, such as the position depicted in FIGS. 3 and 5. As shown, the second position may include support rods 50 contracted and coil springs 52 compressed to a degree sufficient to cause brake 54 to engage rear wheel 36. During use, a user may desire to slow down or stop skate 12 while moving forward. Wheels 24, 26 may be slowed through a braking system, for example, which may be activated when a rearward tilting of skate 12 is detected.

In order to assist in slowing down, the rearward tilting may cause brake 54 to eventually contact rear wheel 36, inhibiting rotation of rear wheel 36 and slowing down and/or stopping skate 12. In some instances, skate 12 may be stationary, and a user may tilt frame 14 rearward to the second position to inhibit rotation of rear wheel 36 (and thus rotation of wheels 24, 26 through frictional engagement between rear wheel 36 and the ground G), thereby allowing a user wearing skate 12 to remain stationary without skate 12 inadvertently rolling. The user may tilt frame 14 forward from the second position to release brake 54 and start or continue traveling across the ground G.

The specification has described an exemplary suspension system for a transportation device. It should be clear that the examples presented herein are for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

It is intended that the disclosure and examples be considered as exemplary only, with a true scope and spirit of disclosed embodiments being indicated by the following claims.

What is claimed is:

1. A transportation device, comprising:
    a frame configured to support at least a portion of a user; and
    a support system configured to support the frame above the ground, the support system including:
        a first wheel connected to the frame;
        a second wheel connected to the frame; and
        a suspension system connected to the frame, the suspension system including:
            a rear wheel pivotally connected to a first portion of the frame; and
            a shock absorber connected between an axle of the rear wheel and a second portion of the frame,
            wherein the shock absorber includes a pair of shock absorbers connected on opposite sides of the rear wheel.

2. The transportation device of claim 1, wherein the rear wheel is connected to the first portion of the frame by at least one swing arm.

3. The transportation device of claim 2, wherein the at least one swing arm is pivotally connected to the first portion of the frame at a first end and connected to the axle of the rear wheel at a second end.

4. The transportation device of claim 3, wherein the at least one swing arm includes a pair of swing arms pivotally connected to the first portion of the frame at first ends and connected to the axle of the rear wheel at second ends.

5. The transportation device of claim 4, wherein the pair of swing arms extend toward each other as they extend away from the frame.

6. The transportation device of claim 1, wherein the shock absorber includes a support rod and a coil spring.

7. The transportation device of claim 1, wherein the frame includes a platform, a pair of side supports, and a rear support.

8. The transportation device of claim 7, wherein the first portion of the frame is a lower portion of the pair of side supports, and the second portion of the frame is a portion of the rear support.

9. The transportation device of claim 1, further including a brake configured to selectively inhibit rotation of the rear wheel.

10. The transportation device of claim 9, wherein the brake is rigidly connected to the frame such that a sufficient rotation of the frame with respect to the rear wheel causes the brake to contact the rear wheel.

11. The transportation device of claim 9, wherein the frame includes a platform configured to support a user's foot and the brake is rigidly connected to the platform.

12. The transportation system of claim 1, wherein diameters of the first wheel and the second wheel are at least three times greater than a diameter of the rear wheel.

13. A transportation device, comprising:
    a frame configured to support at least a portion of a user; and
    a support system configured to support the frame above the ground, the support system including:
        a first wheel connected to the frame;
        a second wheel connected to the frame; and
        a suspension system connected to the frame, the suspension system including:
            a rear wheel pivotally connected to a first portion of the frame; and
            a shock absorber connected between the rear wheel and a second portion of the frame,
        wherein the shock absorber includes a pair of shock absorbers connected on opposite sides of the rear wheel.

14. The transportation device of claim 13, wherein the rear wheel is connected to the first portion of the frame by at least one swing arm.

15. The transportation device of claim 14, wherein the at least one swing arm is pivotally connected to the first portion of the frame at a first end and connected to an axle at a second end.

16. The transportation device of claim 15, wherein the at least one swing arm includes a pair of swing arms pivotally connected to the first portion of the frame at first ends and connected to the axle at second ends.

17. The transportation device of claim 16, wherein the pair of swing arms extend toward each other as they extend away from the frame.

18. The transportation device of claim 13, wherein the shock absorber includes a support rod and a coil spring.

19. The transportation device of claim 13, wherein the frame includes a platform, a pair of side supports, and a rear support.

20. A transportation device, comprising:
    a frame configured to support at least a portion of a user; and
    a support system configured to support the frame above the ground, the support system including:
        a first wheel connected to the frame;
        a second wheel connected to the frame; and
        a suspension system connected to the frame, the suspension system including:
            a rear wheel pivotally connected to a first portion of the frame;
            a shock absorber connected between the rear wheel and a second portion of the frame; and
        a brake configured to selectively inhibit rotation of the rear wheel.

21. The transportation device of claim 20, wherein the brake is rigidly connected to the frame such that a sufficient rotation of the frame with respect to the rear wheel causes the brake to contact the rear wheel.

22. The transportation device of claim 20, wherein the frame includes a platform configured to support a user's foot and the brake is rigidly connected to the platform.

23. The transportation device of claim 20, wherein the rear wheel is connected to the first portion of the frame by at least one swing arm.

24. The transportation device of claim 23, wherein the at least one swing arm is pivotally connected to the first portion of the frame at a first end and connected to an axle at a second end.

25. The transportation device of claim 24, wherein the at least one swing arm includes a pair of swing arms pivotally connected to the first portion of the frame at first ends and connected to the axle at second ends.

26. The transportation device of claim 25, wherein the pair of swing arms extend toward each other as they extend away from the frame.

27. The transportation device of claim 20, wherein the shock absorber includes a support rod and a coil spring.

28. The transportation device of claim 20, wherein the frame includes a platform, a pair of side supports, and a rear support.

29. A transportation device, comprising:
- a frame configured to support at least a portion of a user; and
- a support system configured to support the frame above the ground, the support system including:
  - a first wheel connected to the frame;
  - a second wheel connected to the frame; and
  - a suspension system connected to the frame, the suspension system including:
    - a rear wheel pivotally connected to a first portion of the frame; and
    - a shock absorber connected between the rear wheel and a second portion of the frame,
- wherein diameters of the first wheel and the second wheel are at least three times greater than a diameter of the rear wheel.

* * * * *